United States Patent
Sherwood

(10) Patent No.: US 10,316,153 B2
(45) Date of Patent: *Jun. 11, 2019

(54) SOLVENT FREE SOLID MATERIAL

(71) Applicant: Melior Innovations, Inc., Houston, TX (US)

(72) Inventor: Walter Sherwood, Glenville, NY (US)

(73) Assignee: Melior Innovations, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,026

(22) Filed: Nov. 11, 2017

(65) Prior Publication Data

US 2018/0291159 A1 Oct. 11, 2018

Related U.S. Application Data

(63) Continuation of application No. 14/212,896, filed on Mar. 14, 2014, now Pat. No. 9,815,952.

(60) Provisional application No. 61/788,632, filed on Mar. 15, 2013.

(51) Int. Cl.
C08J 3/24 (2006.01)

(52) U.S. Cl.
CPC .................................. C08J 3/24 (2013.01)

(58) Field of Classification Search
CPC .......................................................... C08J 3/24
USPC .......................................................... 524/577
See application file for complete search history.

(56) References Cited

U.S. PATENT DOCUMENTS

2013/0122763 A1* 5/2013 Fish ..................... B32B 5/022
442/59

* cited by examiner

Primary Examiner — Hui H Chin
(74) Attorney, Agent, or Firm — Glen P. Belvis; Belvis Law, LLC

(57) ABSTRACT

A solid material can be prepared from a liquid precursor in solvent free conditions.

7 Claims, No Drawings

SOLVENT FREE SOLID MATERIAL

PRIORITY CLAIM

This application is a continuation of U.S. patent application Ser. No. 14/212,896 filed Mar. 14, 2014, which claims under 35 U.S.C. § 119(e)(1), the benefit of the filing date of Mar. 15, 2013, of provisional application Ser. No. 61/788,632, the entire disclosure of each of which is incorporated herein by reference.

TECHNICAL FIELD

This invention relates to solvent-free bulk solid materials.

BACKGROUND

Solvent free polymerization is generally useful to create elastomeric materials.

SUMMARY

In general, a solid, solvent-free composition can be prepared by mixing liquid components in the absence of a solvent to form a premixture, the premixture including addition reaction cross-linkable groups, and crosslinking the premixture in the absence of a solvent to form a solid structure free of ester, carbonate, carbamate or urea linkages. The content of addition reaction cross-linkable groups can be between 2 and 50%, or between 5 and 40%. The addition reaction cross-linkable groups can include vinyl, allyl, propargyl, or ethynyl groups, or combinations thereof. The curing or crosslinking method can include adding a catalyst, the use of light, heat, or a combination thereof to the premixture. The catalyst can be a transition metal catalyst, a peroxide catalyst, an acid, a base, or a combination thereof.

In another aspect, the resulting solid can be a cross-linked polymer matrix of controllable cross-link density having a density of from 0.99 g/cc to 1.25 g/cc, a hardness from Shore D35 to Shore D85, and a flexural strength of up to 3 ksi.

In certain circumstances, the composition can have a flame resistance of UL-V0.

A composite composition can be made by forming the cross-linked polymer matrix in the presence of fibers, such as glass fibers, basalt fibers or carbon fibers. The fibers can be glass fibers or carbon fibers or combinations thereof. The composite composition can have a a flexural strength of 40 ksi to 140 ksi, or 60 ksi to 120 ksi.

Other aspects, embodiments, and features will be apparent from the following description, the drawings, and the claims.

DETAILED DESCRIPTION

A solvent free premixture of components can be prepared from a first component and a second component. The first component has an addition reaction cross-linkable group including at least one carbon-carbon double bond. The second component includes an addition reaction cross-linkable group including at least one reactive moiety capable for addition over the carbon-carbon bond. For example, the first component can include one or more vinyl, alpha-beta unsaturated ketone group, or aryl group. The second component can include one or more radical or anion creation sites. For example, the second component can have an alpha-ketone group, a benzyl group or a hydrosilyl group.

Each of the first component and the second component can have a low molecular weight core structure to support the cross-linkable groups. Each core structure can be a polyalkylene, polyalkylene oxide, polystryrene, polyphenyl, polysiloxane, polysilazane, or copolymers thereof, having molecular weights of 100 to 10,000 daltons, for example 200 to 5,000 daltons. The core structure can be substituted or unsubstituted.

The first component can be a mixture of compositions having comparable addition reaction cross-linkable groups. The second component can be a mixture of compositions having comparable addition reaction cross-linkable groups. Each component can have a viscosity of between 5 cps and 1000 cps.

The addition reaction cross-linkable group of the first component, or mixture constituting the first component can be 0.01% to 5%, or 0.1% to 4% of the composition of the first component.

The addition reaction cross-linkable group of the second component, or mixture constituting the second component can be 10% to 50%, or 20% to 40% of the composition of the second component.

The premixture can include 10% to 90% of the first component and 10% to 90% of the second component. The premixture can have a flashpoint in the range from 70° C. to 120° C., making the material non-hazardous for shipping.

A third component can be added to the premixture to modify the properties of the final product. Such modifications could include but are not limited to altering rheology of the polymer, the crosslink density, toughness, and hardness. For example, a monomeric material such as ethylene, propene, butene, butadiene, pentene, pentadiene, organo silanes, styrene, or divinylbenzene can be added.

The premixture is free of solvent, meaning that all, or nearly all, of both the initial compositions and the material is crosslinked into the final solid product and that there are no low molecular weight byproducts to the cross-linking reaction. Once the appropriate catalyst is added to the premixture, such as a peroxide, an amine, an acid or a metal catalyst (e.g. palladium, rhodium, cerium, zinc, boron, tin, nickel, copper, cobalt, or iron catalysts) in a concentration of 1 to 2000 ppm, the premixture begins to cure. The minimum cure temperature can be near room temperature, or 20° C.-30° C. in 4-24 hours depending on the formulation. The temperature can be increased to accelerate the reaction as long as the oxidative degradation temperature is not exceeded.

The curing process can take place in a mold to form a final shaped product. Alternatively, the curing conditions can be optimize to deposit coatings, extrude fibers, pelletize, spray form particles, or other manufacturing techniques.

The resulting solid materials can have the properties described herein. The solid materials can be further processed for a variety of uses.

Other embodiments are within the scope of the following claims.

What is claimed is:

1. A solid, solvent-free solid material consisting essentially of: a polysiloxane having a cross-linked polymer matrix having a density of from 0.99 g/cc to 1.25 g/cc, the composition being free of ester, carbonate, carbamate or urea linkages, wherein the physical properties defined by the composition comprise a hardness of Shore D35, and a flexural strength of up to 3 ksi.

2. A method of synthesizing a solid material in the absence of solvent comprising:

mixing liquid components consisting essentially of a polysiloxane in the absence of a solvent to form a premixture, the premixture including between 2 and 50% addition reaction cross-linkable groups of the liquid components; and crosslinking the premixture in the absence of a solvent to form a solid structure free of ester, carbonate, carbamate or urea linkages.

3. The method of claim 2, further comprising adding a catalyst, light, heat, or a combination thereof to the premixture.

4. The method of claim 2, wherein the premixture includes between 5 and 40% addition reaction cross-linkable groups of the liquid components.

5. The method of claim 2, wherein the addition reaction cross-linkable groups are vinyl, allyl, propargyl or ethynyl groups.

6. A method of synthesizing a solid material in the absence of solvent comprising:

mixing a first and a second liquid component in the absence of a solvent to form a premixture, the first component consisting essentially of a polysiloxane, the second component including addition reaction cross-linkable groups, wherein the addition reaction groups are 5-40% of the second component; and crosslinking the premixture in the absence of a solvent to form a solid structure free of ester, carbonate, carbamate or urea linkages.

7. The method of claim 6, wherein the addition reaction cross-linkable groups are selected from the group consisting of vinyl, allyl, propargyl and ethynyl groups.

\* \* \* \* \*